United States Patent [19]

Asaeda

[11] Patent Number: 4,710,862

[45] Date of Patent: Dec. 1, 1987

[54] INVERTER

[75] Inventor: Takeaki Asaeda, Hyogo, Japan

[73] Assignee: Mitsubishi Denki Kabushiki Kaisha, Tokyo, Japan

[21] Appl. No.: 720,962

[22] Filed: Apr. 8, 1985

[30] Foreign Application Priority Data

Jul. 27, 1984 [JP] Japan .................................. 59-158320

[51] Int. Cl.$^4$ .............................................. H02H 7/122
[52] U.S. Cl. ......................................... 363/58; 363/27
[58] Field of Search ...................... 363/17, 27, 56, 57, 363/58, 98

[56] References Cited

U.S. PATENT DOCUMENTS 4,336,587  6/1982  Boettcher, Jr. et al. ............. 363/56
4,611,267  9/1986  McMurray ............................. 363/58

Primary Examiner—Patrick R. Salce
Assistant Examiner—Anita M. Ault
Attorney, Agent, or Firm—Bernard, Rothwell & Brown

[57] ABSTRACT

An inverter comprises a pair of reactors connected in series between a positive arm element and a negative arm element, snubbers each connected in parallel to respective arm elements, and a feedback circuit for transferring electrical energy stored in the snubbers back to the d.c. power source. The feedback circuit includes a self turn-off switching device which is controlled to become conductive during a certain period in correspondence to the on-off operation of the arm elements so that energy stored in the snubbers is fed back to the d.c. power source through a current transformer and a rectifying circuit during the on-state of the device.

5 Claims, 7 Drawing Figures

INVERTER

BACKGROUND OF THE INVENTION

1. Field of the Invention

The present invention relates to an inverter having the snubber and, particularly, to an inverter with an improved means for transferring stored energy in the snubber back to the d.c. power source.

2. Description of the Prior Art

FIG. 1 shows a half bridge construction of the conventional inverter circuit, in which the self turn-off switching devices are shown as arm elements. The arrangement includes positive and negative terminals P and N of a d.c. power source; arm elements 1U and 1X that are gate turn-off thyristors (will be termed simply GTO) receiving control signals on their gate terminals from a gate circuit (not shown) so that the GTOs turn on and off alternatively; a serial connection of reactors 2U and 2X connected between the GTO 1U and GTO 1X; feedback diodes 3U and 3X, one (3U) connected in anti-parallel configuration to the GTO 1U, the other (3X) connected in the same fashion to the GTO 1X; snubbers 4U and 4X, each made up of a snubber capacitor 41U (41X) and a snubber diode 42U (42X), connected in parallel to the GTOs 1U and 1X, respectively; a diode circuit 5 with its cathode side connected to the anode of the snubber diode 42U and with its anode side connected to the cathode of the snubber diode 42X; and a current transformer 6 having its primary winding connected in series to the diode circuit 5 and its secondary winding connected on terminals 6a and 6b to the a.c. input of a rectifying bridge 7 consisting of diodes 7a, 7b, 7c and 7d, while the d.c. output of the bridge 7 is connected between the terminals P and N of the d.c. power source.

Next, the operation of the above conventional inverter will be explained with reference to the timing charts of FIGS. 2a and 2b. In FIG. 2a, Tu and Tx represent the second conductive periods of the GTOs 1U and 1X, respectively, Iw is the load current of a load (inductive load in this example), Iu and Ix are the currents in the GTOs 1U and 1X, respectively, Iud and Ixd are the currents in the feedback diodes 3U and 3X, respectively, Vuc and Vxc are the voltages across the snubber capacitors 41U and 41X, respectively, and $I_D$ represents the current flowing through the diode circuit 5 and current transformer 6. FIG. 2b shows the waveform of the voltage and current of the current transformer 6 in a period immediately after the GTO 1U is turned off, with $V_{CT}$ showing the voltage across the primary winding of the current transformer 6.

At a time point t1 when the conductive GTO 1U is turned off, the current Iu which has been flowing in the GTO 1U is transferred to the snubber 4U, and the snubber capacitor 41U begins charging. At this time, charges in the capacitor 41X of the snubber 4X are discharged through the diode 5, current transformer 6, diode 42U, reactor 2U and a.c. output terminal U to the load (not shown). At time point t2, discharging completes, and the feedback diode 3X becomes conductive. During this period the secondary output of the current transformer 6 is fed back to the d.c. power source through the diodes 7a and 7d in the rectifying bridge 7, and a voltage proportional to the d.c. power source voltage is generated across the primary winding of the current transformer 6.

Subsequently, energy stored in the reactor 2U is fed back to the d.c. power source via the path including the reactor 2U, reactor 2X, snubber diode 42X, diode 5, current transformer 6, and snubber diode 42U, and the current flowing through the reactor 2U and current transformer 6 decreases. At this point t3 when the core of the current transformer 6 reaches a magnetic saturation, the current transformer 6 generates momentarily an excessive voltage in opposite polarity, but, the voltage between the terminals 6a and 6b is clamped to the d.c. power source voltage by the conduction of the diodes 7b and 7c. Although this reverse voltage serves to increase the current in a loop including the snubber diode 42U, reactor 2U, reactor 2X, snubber diode 42X and diode 5, the voltage drop in the loop is small and the current transformer 6 is reset to the voltage equal to this voltage drop. Also the current flowing through the reactor 2U and current transformer 6 decreases very slowly. At time point t4 when the polarity of the load current is reversed, the load current flows through the terminal U, reactor 2X and GTO 1X.

In the conventional snubber energy feedback means, as mentioned above, the reset operation for the current transformer 6 takes place in accordance with the voltage drop in the snubber diodes 42U and 42X, reactors 2U and 2X and diode circuit 5, resulting in a longer reset time needed. If the reset operation does not complete until the time point t1, the time point t3, at which the current transformer 6 is saturated comes earlier, resulting disadvantageously in the impairment of efficiency in transferring snubber energy back to the d.c. power source.

SUMMARY OF THE INVENTION

It is an object of the present invention to provide an improved inverter which operates promptly and surely to reset the current transformer in the feedback circuit for transferring energy stored in the snubber back to the d.c. power source.

According to one aspect of the present invention, the inverter comprises at least a pair of arm elements, each consisting of a self turn-off switching device, forming positive and negative parts; a pair of reactors connected in series between the positive arm element and the negative arm element; first and second snubbers, each consisting of a serial connection of a snubber capacitor and a snubber diode, connected in parallel to the positive and negative arm elements, respectively; a current transformer having primary and secondary windings for retrieving energy stored in the snubbers; a closed circuit including the primary winding of the current transformer and a self turn-off switching device connected in series with each other, with one end of the circuit connected to the node of the diode and capacitor of the first snubber and with another end connected to the node of the diode and capacitor of the second snubber; a rectifying circuit for transferring energy retrieved on the secondary winding of the current transformer back to a d.c. power source; and a gate circuit which produces gate signals for turning on or off the arm switching devices and a gate signal for turning on and keeping on the switching device in the closed circuit for a period long enough to feed back energy stored in the snubber through the current transformer and rectifying circuit to the d.c. power source, and thereafter turning off the switching device, in correspondence to the on-off operation of the arm switching devices.

BRIEF DESCRIPTION OF THE DRAWINGS

FIG. 2b is an enlarged waveform diagram showing part of the waveforms in FIG. 2a;

FIG. 4b is an enlarged waveform diagram showing part of the waveforms in FIG. 4a.

DETAILED DESCRIPTION OF THE PREFERRED EMBODIMENTS

Figure 1:
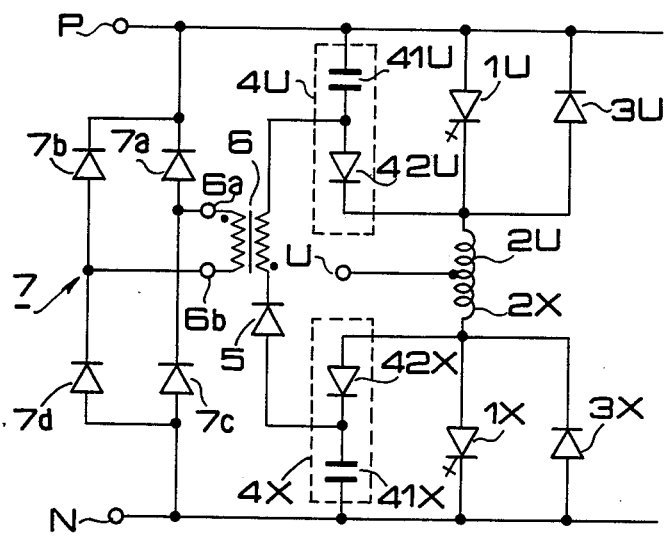
FIG. 1 is a schematic diagram showing the principal portion of a conventional inverter.
Figure 3:
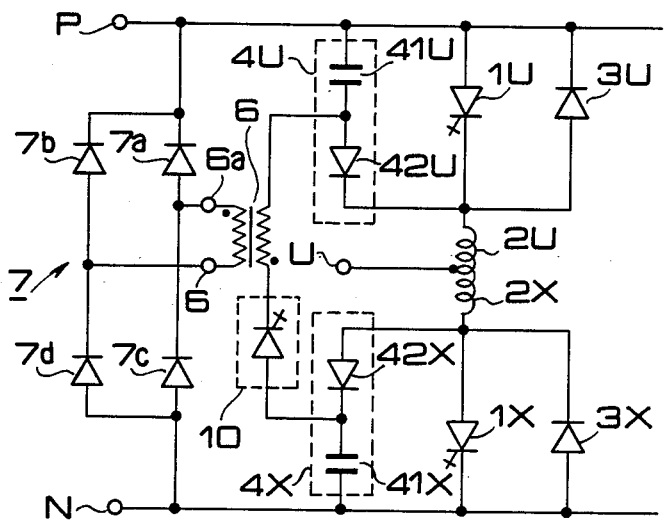
FIG. 3 is a schematic diagram showing the principal portion of the inverter embodying the present invention.
Figure 2A:
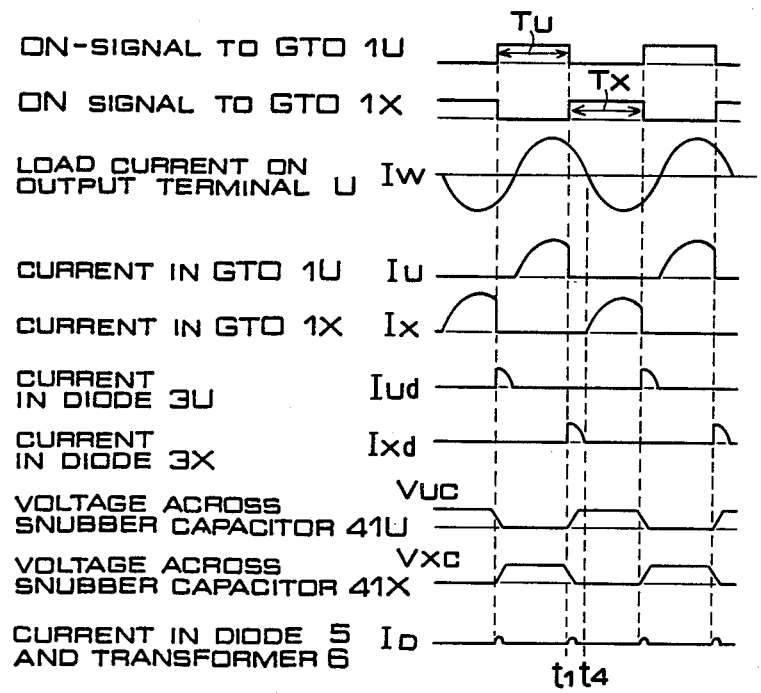
FIG. 2a is a waveform diagram showing various signals, voltages and currents observed in the arrangement of FIG. 1.
Figure 2B:
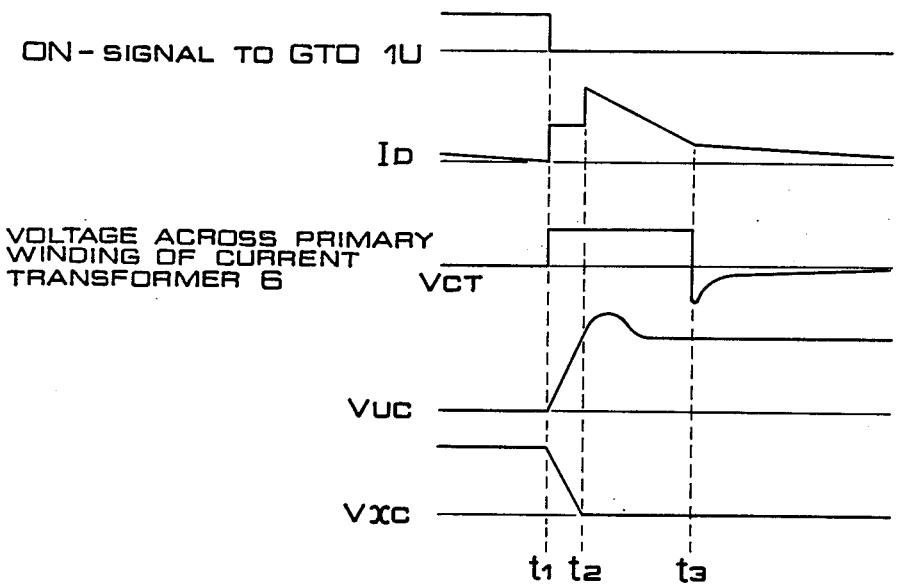

FIG. 3 is an embodiment of this invention, showing its half bridge circuit arrangement as in the case of FIG. 1. The arrangement includes a self turn-off semiconductor switch circuit 10 (consisting of a gate turn-off thyristor in this embodiment) in place of the diode circuit in FIG. 1. The remaining circuit components are identical to those of FIG. 1 and are referred to by the common reference symbols.

The operation of this embodiment will be described with reference to the waveform diagram of FIG. 4a and its partial enlarged view of FIG. 4b. At a time point t1 when the conductive GTO 1U is turned off, the current which has been flowing in the GTO 1U is transferred to the snubber 4U, and the snubber capacitor 41U starts charging. At the same time, the GTO 10 receives an on-signal from a gate circuit (not shown), and it is turned on. Then, charge in the snubber capacitor 41X in the snubber 4X is discharged to the load circuit (not shown) through the GTO 10, current transformer 6, diode 42U, reactor 2U, and a.c. output terminal U. At time point t2 when the discharging completes, the diode 42X and feedback diode 3X become conductive. The discharge current $I_G$ flowing through the GTO 10 (will be termed "feedback current") is collected by the secondary winding of the current transformer 6 and fed back to the d.c. power source through the diode rectifying bridge 7. After the time point t2, the current in the reactor 2U flows through the reactor 2X, diode 42X, GTO 10, current transformer 6, and diode 42U, and fed back to the d.c. power source via the diodes 7a and 7d on the secondary winding of the current transformer 6. At time point t3 when the feedback current $I_G$ falls to zero, the current in the reactor 2U also becomes zero, and the load current flows through the diode 3X and reactor 2X. The current transformer 6 operates immediately after the time point t3 to generate momentarily a voltage which is clamped to the d.c. power voltage as in the case of the conventional arrangement (FIG. 1), and subsequently it is reset to the voltage equal to the voltage drop across the snubber diode 42U, reactors 2U and 2X, snubber diode 42X and GTO 10. At time point t4 when the GTO 10 is turned off, the primary winding of the current transformer 6 is virtually open-circuitted, and the excitation current for the current transformer 6 is fed back to the d.c. power source via the diodes 7b and 7c on the secondary winding of the current transformer 6. This causes the application of a voltage equal to the d.c. power source but in opposite polarity to the secondary winding of the current transformer 6. At time point t5 when the excitation current decreases to zero, the voltage applied to the current transformer 6 falls to zero.

Thus, the current transformer 6 is reset surely in a short time, whereby energy stored in the snubber can be fed back to the power source efficiently. The GTO 10 has an anode-cathode application voltage comparable to the primary voltage of the current transformer 6 (generally the turn ratio of the transformer is smaller than 1), and has a turn-off characteristic of shutting off the current near the zero level, allowing it to be of a very low shut-off rating as compared with the GTOs 1U and 1X constituting the arm elements.

Although the foregoing embodiment employs a GTO as a self turn-off semiconductor device 10, it may be another type of self turn-off semiconductor switching device such as a transistor, MOS FET and SIT. While a snubber and anti-parallel diode usually connected to the GTO 10 have not been mentioned in the above description, the GTO 10 may be accompanied by these components if needed.

Figure 4A:
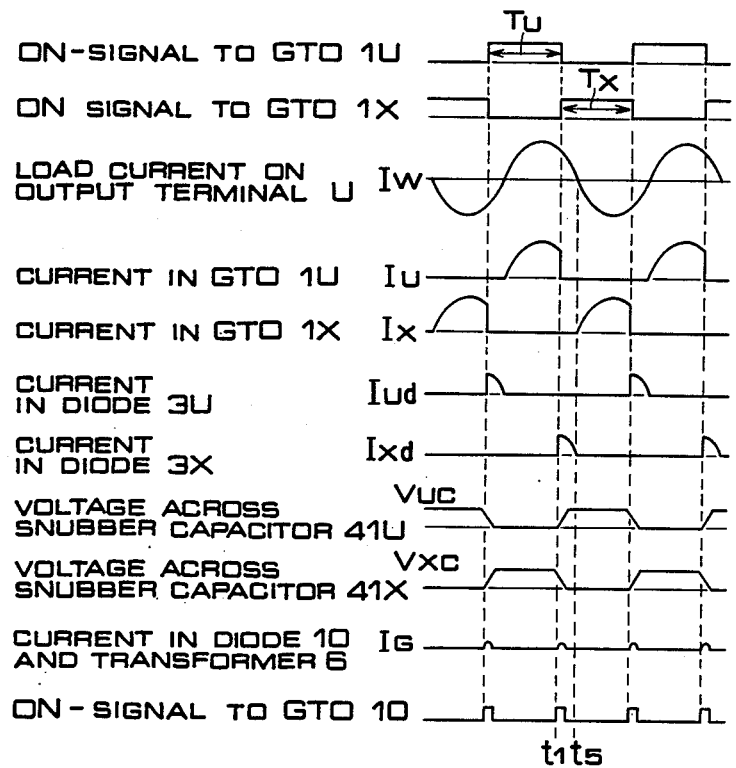
FIG. 4a is a waveform diagram showing various signals, voltages and currents observed in the arrangement of FIG. 3.
Figure 4B:
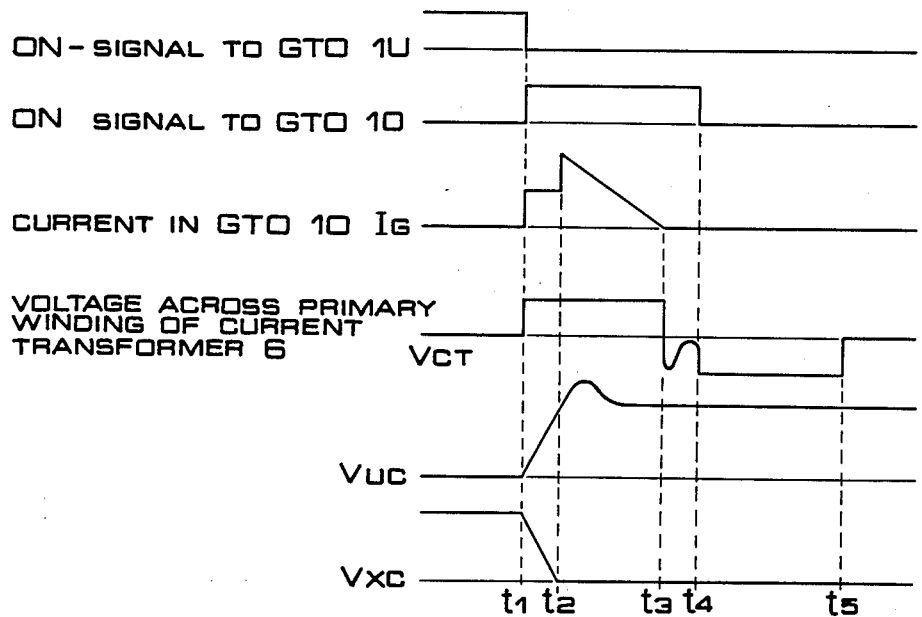

Although the description of operation in connection with FIGS. 4a and 4b is for the case of a lag-phase load, the inventive inverter is fairly operable also for a lead-phase load. For example, when the GTO 1U is turned off while a positive current is being fed to the load via the diode 3X and reactor 2X, the snubber capacitor 41U is charged and the snubber capacitor 41X is discharged, and also in this case energy stored in the snubber is fed back to the d.c. power source via the current transformer 6. Turn-on of the GTO 10 is timed to turn-off of the GTO 1U in this case.

Because of the fast reset operation of the current transformer 6, the inventive arrangement can readily be applied to the inverter designed for high frequency modulation control (PWM).

Figure 5:
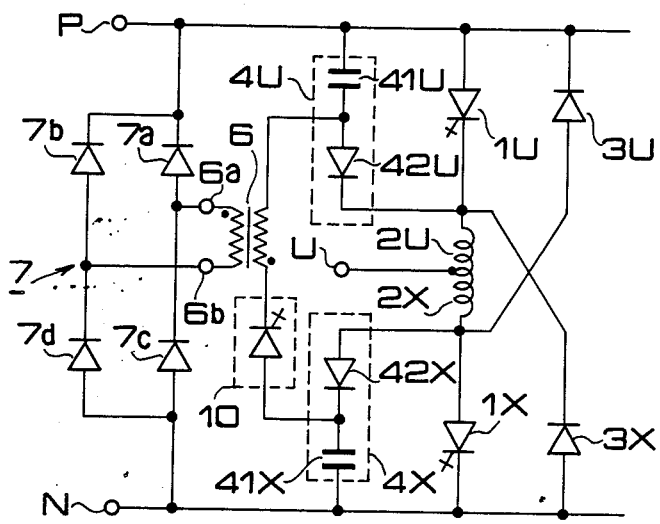
FIG. 5 is a schematic diagram showing another embodiment of the invention.

Although in the foregoing embodiment the feedback diodes 3U and 3X are connected in parallel to the GTOs 1U and 1X, respectively, in opposite polarity relationship, the same effect is achieved by a modified arrangement shown in FIG. 5 in which the diode 3U is connected in parallel to a serial connection of the GTO 1U and reactors 2U and 2X, and the diode 3X is connected in parallel to a serial connection of the GTO 1X and reactors 2U and 2X.

Although the arrangement and operation of a half bridge have been described, the same effect is achieved for a multi-phase inverter constructed by parallel connection of a plurality of the half bridge configuration.

Although the use of GTOs as a self turn-off switching device has been described for the illustrative purpose, any other switching device having the self turn-off ability, such as transistors, SITs and SITHs may be used.

It is evident that energy stored in the snubber and retrieved on the feedback current transformer in the foregoing embodiments may be supplied to a separate power source.

As described above, the inventive arrangement includes the self turn-off semiconductor device 10 connected to the primary winding of the current transformer 6 so that the reset operation for the current transformer 6 is implemented by the secondary winding of the current transformer 6, whereby the current transformer 6 can be reset surely in a short time, the current transformer 6 can be of a small capacity, and the switching frequency of the inverter can be increased.

What is claimed is:

1. An inverter comprising:
   at least a pair of arm elements, each comprising a self turn-off switching device forming positive and negative parts;
   a pair of reactors connected in series between said positive and negative arm elements;
   first and second snubbers, each including a serial connection of a snubber capacitor and a snubber diode, connected in parallel to said positive and negative arm elements, respectively;
   a current transformer having primary and secondary windings for retrieving electrical energy stored in said snubbers;
   a third closed circuit including the primary winding of said current transformer and a self turn-off switching device connected in series to said primary winding, with one end of said circuit being connected to the node of said diode and capacitor in said first snubber, and with another end of said circuit being connected to the node of said diode and capacitor in said second snubber;
   a rectifying circuit for transferring electrical energy retrieved on the secondary winding of said current transformer back to a d.c. power source; and
   a gate circuit which produces gate signals for turning on or off said switching devices forming said arm elements, and a gate signal for turning on and keeping on said switching device in said closed circuit for a period long enough to transfer energy stored in said snubbers back to said d.c. power source through said current transformer and said rectifying circuit, and thereafter turning off said switching device, in correspondence to the on-off operation of said arm switching devices.

2. An inverter according to claim 1, wherein said third self turn-off switching device comprises a gate turn-off thyristor.

3. An inverter according to claim 1, wherein said third self turn-off switching device comprises any one of a transistor, MOS FET and SIT.

4. An inverter according to claim 1, wherein each of said first named self turn-off switching devices is a gate turn-off thyristor and wherein a diode is connected in anti-parallel relationship with each of said gate turn-off thyristors.

5. An inverter according to claim 1 which further comprises an anti-parallel connection of a diode connected across a serial connection of one of said arm elements and said reactor pair, and another anti-parallel connection of a diode connect across a serial connection of another of said arm elements and said reactor pair.

* * * * *

UNITED STATES PATENT AND TRADEMARK OFFICE
CERTIFICATE OF CORRECTION

PATENT NO. : 4,710,862

DATED : December 1, 1987

INVENTOR(S) : Takeaki Asaeda

It is certified that error appears in the above-identified patent and that said Letters Patent is hereby corrected as shown below:

Column 5, line 18, delete the word "third";

line 19, after "a" insert the word --third--.

Signed and Sealed this

Twenty-fourth Day of May, 1988

Attest:

DONALD J. QUIGG

*Attesting Officer*  *Commissioner of Patents and Trademarks*